United States Patent

Wechsberg et al.

[11] 3,919,295
[45] Nov. 11, 1975

[54] PREPARATION OF INORGANIC FLUORIDE-FREE PERFLUOROALKANE SULPHONATES

[75] Inventors: Manfred Wechsberg, Opladen; Hans Niederprüm, Monheim, both of Germany

[73] Assignee: Bayer Aktiengesellschaft, Leverkusen, Germany

[22] Filed: Mar. 26, 1974

[21] Appl. No.: 454,875

[30] Foreign Application Priority Data
Apr. 16, 1973  Germany.......................... 2319078

[52] U.S. Cl. ... 260/501.14; 260/501.21; 260/513 H
[51] Int. Cl.² ............... C07C 129/00; C07C 143/02
[58] Field of Search ....... 260/513 H, 501.14, 501.21

[56] References Cited
UNITED STATES PATENTS

| | | | |
|---|---|---|---|
| 2,732,398 | 1/1956 | Brice et al. | 260/503 |
| 2,877,267 | 3/1959 | Tiers et al. | 260/513 H |

OTHER PUBLICATIONS
Burdon et al., J. Chem. Soc., pp. 2574–2578 (1957).

*Primary Examiner*—James O. Thomas, Jr.
*Assistant Examiner*—Nicky Chan
*Attorney, Agent, or Firm*—Burgess, Dinklage & Sprung

[57]  ABSTRACT

In the preparation of a fluoride-free salt of a perfluoroalkane sulphonic acid of the formula $R_F SO_3H$, in which $R_F$ is a perfluoroalkane radical containing 1 to about 10 carbon atoms, wherein the corresponding perfluoroalkane sulphonyl fluoride is subjected to alkaline hydrolysis in liquid medium to produce an inorganic fluoride along with the perfluoroalkane sulphonic acid, the improvement which comprises adding to the hydrolysis mixture cations which form insoluble fluorides, whereby the insoluble fluorides of said cations precipitate out from the liquid medium having the perfluoroalkane sulphonate dissolved therein, separating the precipitate from the liquid medium, and thereafter isolating the perfluoroalkane sulphonate from the liquid medium. Advantageously the additive is calcium oxide and/or hydroxide.

4 Claims, No Drawings

PREPARATION OF INORGANIC FLUORIDE-FREE PERFLUOROALKANE SULPHONATES

This invention relates to a method of preparing very pure salts of perfluoroalkane sulphonic acids by the alkaline hydrolysis of perfluoroalkane sulphonic acid fluorides.

Perfluoroalkane sulphonyl fluorides, which may now be obtained fairly easily by electrofluorination, are valuable intermediate products and are already being produced on a commercial scale. The secondary and end products obtained from them have unusual chemical and physical properties. It is for this reason that there is a great technical interest in the use of fluorochemicals for rendering textile, leather or paper oleophobic and hydrophobic, in the field of surface chemistry and as fire extinguishing agents. They are also constantly becoming established in new fields of application.

In contrast to perfluorocarboxylic acid fluorides, perfluoroalkane sulphonic acid fluorides are substantially stable in water and can be saponified by alkaline hydrolysis since even acid hydrolysis will not decompose them completely even at elevated temperatures (T. Gramstad and R. N. Haszeldine, J. Chem. Soc, 1956, 173). The preparation of perfluoroalkane sulphonic acid salts is accordingly carried out by the alkaline hydrolysis of perfluoroalkane sulphonyl fluorides to the corresponding sulphonate and inorganic fluoride. The reaction mixture inevitably contains 50 mole percent of inorganic fluoride after the reaction and must therefore be extracted with an organic solvent such as acetone or ethyl alcohol to purify and isolate the sulphonate (U.S. Pat. No. 2,732,398 and Burdon, Farazmand, Stacey and Tatlow, J. Chem. Soc 1957, 2574).

Perfluoroalkane sulphonic acid salts are frequently required to have a very high degree of purity as, for example, the sulphonates used for flameproofing polycarbonates, since even traces of inorganic impurities will have a very deleterious effect on the properties of the polycarbonate.

To prepare a highly pure perfluoroalkane sulphonic acid salt it has therefore previously been necessary either to extract the fluoride formed by hydrolysis or to obtain the pure product by way of the free acid. In the latter case, the initially impure, crude perfluoroalkane sulphonic acid salt is converted into the free sulphonic acid by distilling with concentrated sulphuric acid. The resulting free sulphonic acid is then neutralized with the corresponding base to yield the desired pure perfluoroalkane sulphonate. Apart from the fact that such a roundabout method of synthesis is uneconomical, the preparation of perfluoroalkane sulphonic acids from a sulphonate which is contaminated with inorganic fluorides has a serious disadvantage because of the highly corrosive hydrogen fluoride formed in the reaction.

It is accordingly an object of the invention to provide a simplified, inexpensive process for preparing inorganic fluoride-free perfluoroalkane sulphonic acids within the framework of the alkaline hydrolysis in liquid medium of a perfluoroalkane sulphonyl fluoride of the formula $R_FSO_3H$, in which $R_F$ is a straight or branched chain perfluoroalkane radical of 1 to about 10 carbon atoms, to produce an inorganic fluoride along with the desired perfluoroalkane sulphonic acid.

In accordance with the invention there is added to the liquid medium cations which form insoluble fluorides, whereby the insoluble fluorides of said cations precipitate out from the liquid medium having the perfluoroalkane sulphonate dissolved therein, the precipitate is separated from the liquid medium, and the perfluoroalkane sulphonate is thereafter isolated from the liquid medium.

It was surprising to find that preparation of the product and defluoridation could be combined in a simple working step in accordance with the invention and a sulphonate could be obtained which would have a fluoride content of at the most a few ppm. The process is particularly suitable for large scale synthesis of perfluoroalkane sulphonates and is distinctly superior, both in technological and economical respects, to the methods of preparation and processes previously practised and described (see e.g. Schröder. Gänswein and Brauer, Z. anorg. allg. Chem. 391,295-301).

The process according to the invention is suitable for producing any salts of perfluoroalkane sulphonic acids. The following examples are chosen from among those perfluoroalkane sulphonic acids which have achieved some position of technical importance: Potassium perfluorobutane sulphonate, potassium trifluoromethane sulphonate, potassim perfluorooctane sulphonate, triethylammonium perfluorooctane sulphonate, and ammonium perfluorooctane sulphonate.

The cations which form insoluble compounds with the fluorides may be added to the reaction mixture in any form, preferably in the form of oxides, carbonates or hydroxides. Cations which form insoluble compounds are those which under the prevailing reaction conditions react with the inorganic fluoride formed on hydrolysis to yield an insoluble compound which has a solubility product of not more than about $10^{-6}$ in the given solvent. Cations suitable for this purpose are, for example, calcium, strontium, barium, magnesium and lead, calcium being preferred. The cations are preferably used in the form of their oxides or hydroxides in order to prevent the accidental introduction of additional anions.

The process according to the invention will now be explained in more detail with reference to a particularly preferred form of the process using calcium oxide or calcium hydroxide. The reaction may be represented schematically as follows:

$$R_F-SO_2F + OH + \tfrac{1}{2}CaO \rightarrow \tfrac{1}{2}CaF_2 + R_FSO_3M$$

in which M represents a metal, e.g. Na, K, Li, Ca or Ba, or an optionally substituted ammonium group or strong organic nitrogen bases such as guanidine.

When calcium compounds are used in the form of calcium oxide or hydroxide which, of course, do not introduce any foreign anions into the reaction mixture, 1 mole of fluoride anion becomes bound with calcium in the form of insoluble calcium fluoride so that one hydroxide ion equivalent becomes available for further saponification. The equivalent ratio of primary base to calcium hydroxide therefore must not be greater than 1. However, optimum defluoridation is rarely obtained if an exact equivalent ratio of 1 is used, so it is generally necessary to use an excess corresponding to an equivalent ratio of primary base to calcium compound of less than 1. The optimum ratio in each case must be determined empirically on account of the varying degree of purity of the reactants, especially that of the perfluoroalkane sulphonyl fluoride.

The sulphonyl fluoride is introduced into the basic solution in the reaction vessel, for example by means of an adjustable feed pump, at such a rate that there is just a slight reflux. The reaction velocity naturally also depends on the conditions of the apparatus such as the intensity of mixing of the reactants, so that the feed rate of the sulphonyl fluoride must always be determined empirically in accordance with the other parameters of the reaction such as the reaction temperature. The optimum reaction temperature lies within the range of about 20° to 100°C but the temperature employed need not be restricted to this range and may assume any value between about 0° to 250°C.

The calcium compound may be added to the mixture either before, during or after hydrolysis but is preferably added at the beginning of hydrolysis because it has surprisingly been found that in such case the calcium fluoride precipitates obtained can easily be filtered off by ordinary methods of filtration.

The conditions under which the fluoride, which is insoluble in water or aqueous organic systems, is separated from the perfluoroalkane sulphonic acid salt depends mainly on the solubility properties of the sulphonate and must also be determined empirically. In general, separation is achieved simply by filtration of the calcium fluoride at a temperature at which the sulphonate is readily soluble. The sulphonate is then isolated by crystallization at a lower temperature or by evaporation of the solvent. Since the mother liquor can always be used again, successful separation in cases where the product is isolated by crystallization depends only on the temperature coefficient of the solubility of the sulphonate, which must be sufficiently large without the residual solubility of the sulphonate playing a significant role at the crystallization temperature.

In addition to water, the following organic solvents may be used in admixture with water as the liquid medium according to the invention: methanol, ethanol, dimethylformamide, dimethylsulphoxide and others.

The process according to the invention always provides satisfactory results even in the case of sparingly soluble sulphonates since the solubility of the sulphonate in the reaction medium can be increased as desired within suitable limits by transferring from aqueous to aqueous organic systems. Efficient separation of the calcium fluoride can therefore always be achieved. This applies particularly to longer chain perfluoroalkanesulphonates in which the solubility in water decreases with increasing chain length, even at elevated temperatures.

The process according to the invention will now be described in more detail in the following examples.

EXAMPLE 1

Potassium perfluorobutane sulphonate 120 l of distilled water or mother liquor were pumped into a stirred vessel with a capacity of 250 l and 12.6 kg of potassium hydroxide flakes (0.2 K-mole of 100% KOH) and 6.5 kg of calcium oxide (0.105 K-mole of 100% CaO) were added with stirring. The vessel was firmly sealed and heated to a temperature of between 85°C and 90°C. Perfluorobutane sulphonyl fluoride was then introduced at the rate of 1 to 1.5 kg per hour through a feedpipe dipping into the liquid so that there was as little reflux as possible. When 55 kg of $C_4F_9SO_2F$ (based on 100% product) had been added, the pH of the reaction solution was continuously tested and the addition of perfluorobutane sulphonyl fluoride was continued until the pH was approximately 7.5. The total consumption of 100% sulphonyl fluoride was 59.8 kg (0.198 K-mole of $C_4F_9SO_2F$). The contents of the vessel were then filtered through a hot filter press at 90°C to remove $CaF_2$ and after the stirred vessel had been washed with the mother liquor, the filtrate was pumped back into the vessel for crystallization. The resulting crystal paste was filtered cold at 20°C. The moist cake still contains, on average about 5 to 20% of water which can be removed at 110°C or at a lower temperature in a vacuum drying cupboard. The residue is a white powder of highly purified potassium perfluorobutane sulphonate.

| | |
|---|---|
| Inorganic fluoride content | 0.0006% F⁻ |
| Calcium content | 0.02% |
| Potassium analysis Found: | 11.5% |
| Calculated: | 11.5% |
| Yield 64.2 kg of $C_4F_9SO_3^-K^+$, which corresponds to 96% of the theoretical value. | |

EXAMPLE 2

Potassium trifluoromethane sulphonate 10 mole (560 g) of potassium hydroxide, 5 mole (280 g) of calcium oxide and 4 l of distilled water were introduced into a 10 l flask equipped with reflux condenser, thermometer and gas inlet tube, and 9.2 mole (1400 g) of trifluoromethane sulphonyl fluoride were introduced at such a rate that no reflux could be observed in the dry ice cooler attached to the reflux condenser. The reaction mixture was heated up to 60°C and after termination of the reaction it was stirred for ½ hour at 90°C. After cooling to room temperature, the precipitated calcium fluoride was filtered through a suction filter and the clear filtrate obtained was concentrated by evaporation in a rotary evaporator and dried under vacuum.

| | |
|---|---|
| Inorganic fluoride content | 0.005% F⁻ |
| Calcium content | 0.05% Ca |
| Potassium content: Found | 20.8% K |
| Calculated | 20.8% K |
| Yield: 1590 g of white crystals, which correspond to 92% of the theoretical value. | |
| Melting point: | 232°C |

EXAMPLE 3

Potassium perfluorooctane sulphonate 312 g of perfluorooctane sulphonyl fluoride (0.6 mole of 100% $C_8F_{17}SO_2F$) were added dropwise at 70°C with stirring, to a mixture of 39.6 g of potassium hydroxide (0.6 mole of 100% KOH), 18.7 g of calcium oxide (0.3 mole of 100 % CaO), 500 ml of ethyl alcohol and 500 ml of distilled water. The pH was found to be 7.0 at the end of the reaction. The reaction mixture was filtered through a glass frit at 70°C to remove the precipitated $CaF_2$ and the filtrate was distilled to half its volume. The precipitate which formed in the cold was suction filtered and dried under vacuum at 60°C. Yield: 291 g of $C_8F_{17}SO_3K$, which correspond to 91% of the theoretical value.

Analysis: 0.008% inorganic fluoride 0.01% calcium.

EXAMPLE 4

Triethylammonium perfluorooctane sulphonate 104 g of 96% $C_8F_{17}SO_2F$ (0.2 mole of 100% $C_8F_{17}SO_2F$), 5.85 g of CaO (0.1 mole of 100% CaO) and 800 ml of water were introduced into a reaction vessel and 20.2 (0.2 mole) of triethylamine were added dropwise at 25°C. The reaction mixture was heated 70°C, stirred for 1 hour and filtered hot. The filtrate was then concentrated to about half its volume and after cooling to 15°C it was filtered from the precipitated $[C_8F_{17}SO_3]^-[(C_2H_5)_3NH]^+$. The weight of the filter cake after drying under vacuum at 60°C was 104 g, which corresponds to a yield of 87% of theoretical value.

Analysis: 0.01% of inorganic fluoride 0.08% of calcium.

It will be appreciated that the instant specification and examples are set forth by way of illustration and not limitation, and that various modifications and changes may be made without departing from the spirit and scope of the present invention.

What is claimed is:

1. In the preparation of a fluoride-free salt of a perfluoroalkane sulphonic acid of the formula $R_FSO_3H$, in which $R_F$ is a perfluoroalkane radical containing 1 to about 10 carbon atoms, wherein the corresponding perfluoroalkane sulphonyl fluoride is subjected to alkaline hydrolysis with a primary base whose cation is selected from the group consisting of sodium, potassium, lithium, ammonium, triethylammonium, and guanidinium, in water or aqueous methanol, ethanol, dimethylformamide, or dimethylsulphoxide to produce an inorganic fluoride along with the perfluoroalkane sulphonic acid, the improvement which comprises adding to the hydrolysis mixture at a temperature of about 0°C to 250°C a secondary base whose cation is selected from the group consisting of calcium, strontium, barium, magnesium and lead, whereby the insoluble fluoride precipitates out from the liquid medium having perfluoroalkane sulphonate dissolved therein, separating the precipitate from the liquid medium, and thereafter isolating the perfluoroalkane sulphonate from the liquid medium, the relative proportions of the primary base and the secondary base each being approximately equivalent to the amount of sulphonyl fluoride, the amount of the secondary base being equivalent to or slightly in excess of the amount of the primary base.

2. The method according to claim 1, wherein the cation of the secondary base is calcium.

3. The method according to claim 2, wherein the calcium ion is added as calcium oxide or calcium hydroxide.

4. The method according to claim 1, wherein the reaction is effected in water.

* * * * *